United States Patent [19]

Earl et al.

[11] Patent Number: 5,151,238
[45] Date of Patent: Sep. 29, 1992

[54] PROCESS FOR PRODUCING COMPOSITE MATERIALS

[75] Inventors: Harold A. Earl, Colwyn Bay; William B. Banks, Port Dinorwic, both of Wales

[73] Assignee: National Research Development Corporation, London, England

[21] Appl. No.: 361,044

[22] Filed: Jun. 5, 1989

[30] Foreign Application Priority Data

Jun. 7, 1988 [GB] United Kingdom ............... 8813396

[51] Int. Cl.$^5$ .............................................. B29C 67/20
[52] U.S. Cl. ................................... 264/136; 264/109; 264/128; 264/343; 427/369; 427/439; 427/440; 527/103; 524/702
[58] Field of Search ...................... 427/369, 439, 440; 528/74.5, DIG. 905, 44, 45, 59; 264/109, 319, 128, 136, 320, 343; 156/331.4; 524/13, 702; 527/103, 301

[56] References Cited

U.S. PATENT DOCUMENTS

| 3,870,665 | 3/1975 | Diehr et al. ............................ 524/13 |
| 3,930,097 | 12/1975 | Alberino et al. ..................... 427/369 |
| 4,029,846 | 6/1977 | Decker et al. ....................... 427/439 |
| 4,623,499 | 11/1986 | Fuma et al. ........................ 264/122 |
| 4,752,637 | 6/1988 | Israel ................................ 524/702 |

FOREIGN PATENT DOCUMENTS

| 2127925 | 10/1972 | France . | |
| 58-189278 | 11/1983 | Japan ................................ 524/13 |
| 1148016 | 4/1969 | United Kingdom ................ 427/369 |
| 2076414 | 12/1981 | United Kingdom ................ 528/44 |

OTHER PUBLICATIONS

Meyrick, T. J. and J. T. Watts, "Polyisocyanates in Bonding", Trans. Inst. Rubber Industry (Oct. 1949) pp. 150–166.

"Mill Designed Around New Resin" Edited by Fraser, World Wood, Mar. 1980, p. 7.

"Isocyanate Binder Improves Properties . . . " Wood Based Panels North America Mar. 1985, p. 34.

Redman et al., "Particleboard Binder Promises Performance . . . " Reprinted with Permission of Forest Industries, Apr. 1979.

Bayer"DESMODUR Trial Product PU 1520 E"; Technical Publication.

ICI "Polyurethanes" SUPRASEC 1249 Isocyanate; Technical Publication.

ICI "Polyurethanes" SUPRASEC 1042 Emulsifiable Polymeric Diisocyanato Diphenyl Methane; Technical Publication.

ICI "Polyurethanes" SUPRASEC DND Isocyanate; Technical Publication.

"Bayer Polyurethanes", Bayer AG, pp. 6–9, 214–219.

Primary Examiner—Shrive Beck
Assistant Examiner—Terry J. Owens
Attorney, Agent, or Firm—Nixon & Vanderhye

[57] ABSTRACT

Process for producing a composite material in which a cellulosic substrate is treated with a solution of a polyfunctional isocyanate in an aprotic swelling solvent and the substrate is then compressed to form the composite material. The substrate may take the form of wood chips, wood particles, wood flakes, wood fibers, wood flour, ground wood, wood veneers and wood laminates, paper, card, straw, refined cellulose such as cotton or viscose and plant fibers such as bamboo or palm fiber.

11 Claims, No Drawings

PROCESS FOR PRODUCING COMPOSITE MATERIALS

This invention relates to novel composite materials comprising cellulosic raw materials and to processes for their production.

The composite materials with which this invention is concerned are primarily those which comprise bonded wooden pieces as a substrate such as wood particles or wood veneers but may also comprise any cellulosic material which can be formed into a composite material such as wood fibres, paper and straw. The pieces of the cellulosic substrate have been bonded using a variety of adhesives, e.g. urea-formaldehyde resins or phenol formaldehyde resins which resins are commonly used in the production of chipboard. The composite materials which are produced using these resins are not water resistant and deteriorate upon prolonged contact with or immersion in water. There have also been proposals to formulate composite materials using a polyisocyanate binder as an adhesive, e.g. those described in European Patent 139530 in which the polyisocyanate or an aqueous emulsion thereof is contacted with wood chips and wood flakes in the presence of water. These composites also exhibit poor water resistant properties. We have now discovered that composite materials having improved strength and water resistant properties can be produced by treating a cellulosic substrate with a solution of polyfunctional isocyanate in an aprotic swelling solvent and subsequently forming a composite material incorporating said treated substrate.

Accordingly, from one aspect our invention provides a process for the production of a composite material which comprises the steps of treating a cellulosic substrate with a solution of a polyfunctional isocyanate in an aprotic swelling solvent and forming a composite material incorporating the substrate.

The process of the invention is applicable to a wide variety of cellulosic substrates and the invention provides a corresponding variety of novel composite materials. The substrate may take the form of wood chips, wood particles, wood flakes, wood fibres, wood flour, ground wood, wood veneers and wood laminates, paper, card, straw, refined cellulose such as cotton or viscose and plant fibres such as bamboo or palm fibre. The composite materials produced are preferably formed by the coherence of treated substrate particles but may also be formed by the adherence of a treated substrate to an untreated substrate which itself is preferably a cellulosic material but which may be non-cellulosic. Preferred composite materials which may be produced by the processes of this invention include any of the so-called particleboards, such as chipboard, fibreboard, flakeboard and oriented flakeboard, laminated and veneered boards of all kinds including hardboard and plywood and those wherein wooden laminates or veneers are applied to the surfaces of any of the aforementioned types of composite board; strawboard, paperboard and cardboard; and composites whenever formed by the adhesion of layers of substrate, preferably those wherein both of these substrates are cellulosic substrates but including those wherein only one of the substrates is cellulosic.

The polyfunctional isocyanates which may be useful in the processes of the invention may be any aliphatic, alicyclic or aromatic isocyanate which comprises at least one other functional substituent such as a further isocyanate group, an epoxide group, an ethylenic group or other unsaturated group. In the preferred embodiment wherein the composite material is formed from cellulosic substrates this further functional group will be one which is capable of reaction with cellulose. Examples of suitable groups of functional compounds are isocyanates, epoxides and acid anhydrides. The preferred polyfunctional compounds for use in this invention are the di and poly isocyanates. Examples of useful compounds include toluene 2,4 diisocyanate, toluene 2,6 diisocyanate, diphenyl methane diisocyanate, m- and p- phenylene diisocyanates, m- and p- diphenylene diisocyanates, polymethylene polyphenyl isocyanates, naphthalene 1,5 diisocyanate, chlorophenylene diisocyanate, $\alpha\alpha$ xylene diisocyanate, triphenylmethane triisocyanate, hexamethylene diisocyanate, 3,3'-ditolylene-4,4-diisocyanate, butylene 1,4 diisocyanate, octylene 1,8 diisocyanate and 1,4, 1,3 and 1,2 cyclohexylene diisocyanate. Polyisocyanates which are isocyanate- ended prepolymers made by reacting an excess of a polyisocyanate with a polyol may also be employed, for example those made by reacting an excess of an isocyanate with polyethylene glycol, polypropylene glycol and triethylene glycol as well as glycols or polyglycols which have been partially esterified with carboxylic acids including polyester polyols and polyether polyols. The preferred diisocyanates for present use are hexamethylene diisocyanate, toluene diisocyanate and diphenyl methane diisocyanate.

The isocyanates useful in the processes of this invention are used to treat the cellulose in the form of their solutions in an aprotic swelling solvent. The ability of various solvents especially polar solvents to swell the volume of a given block of wood immersed therein to a significant percentage of that produced by immersion in water is well known. The preferred solvents for use in the processes of this invention are those which produce an increase in external volume of at least 25% preferably at least 50% of that produced by water when a wood block is immersed therein. Examples of these preferred solvents include pyridine, acetone or 2-methyl-2-pyrrolidinone. The concentration of isocyanate in the treatment solution may vary through a wide range say from 10 to 500 gms/liter, preferably 20 to 200 gms/liter but for convenience will normally be within the range 30 to 120 gms/liter. Generally this corresponds to a molar concentration of from 0.5 to 5.0 moles/liter. The solution may be diluted with an inert diluent such as toluene or hexane if desired. Dilution of up to 90% may be utilised.

The presence of a small amount of moisture or other protic solvents during the treatment process may be tolerated. Generally quantities of up to 3% by weight of the weight of the substrate exhibit no significant effect and up to 5% or even 8% may be tolerated although this may result in some deterioration in the properties of the composite material.

The treatment may conveniently be carried out by immersing the substrate in the treatment solution. It is possible to add the polyfunctional isocyanate in separate aliquots but this is generally less preferred. The treatment may be effected at temperatures in the range 25° to 150° C. preferably 50° to 100° C. The duration of treatment may be as short as two minutes or less or as long as 120 minutes or longer, even up to 200 hours or more. The optimum reaction time varies with the temperature and the nature of the polyfunctional isocyanate and the nature of the substrate. The treatment process should preferably be continued until the substrate exhibits a weight percentage gain of from 5 to 25 preferably 8 to 15% (after removal of excess isocyanate solution).

The process may be carried out in the presence of a catalyst for the reaction between the isocyanate and the cellulosic substrate such as an aprotic base, e.g. pyridine, diazobicyclo [2,2,2,] octane or an organotin compound, e.g. dibutyl tin diacetate. Basic aprotic solvents function both as solvent and as a catalyst. They can be used in combination with a catalyst where a particularly rapid rate of reaction is desirable.

The progress of the treatment process can be monitored by measuring the fibre direction tensile strength of the substrate (where appropriate) and the treatment terminated if this beings to reduce. It is a preferred feature of the invention that some degree of functionality of the polyfunctional isocyanate is preserved. This can be monitored by infra-red spectroscopy. Treated products having too low a degree of functionality may give rise to less satisfactory composite materials. In this circumstance it may be necessary to determine the optimum conditions for the treatment process by varying e.g. the conditions under which treatment is effected and the nature of the polyfunctional isocyanate.

In the case of a polyisocyanate it may be preferable to employ a compound in which the isocyanate groups are not equally reactive. An example of such a compound is 2-(4-phenylisocyanate) ethyl isocyanate. In general isocyanate groups which are appendant on an aromatic ring are more reactive than those appendant on an aliphatic group.

The treatment may be carried out simultaneously with the formation of the composite material or as a preliminary to it or by a combination of the two. Where the treatment is a preliminary step it is preferred to drain off the excess treatment solution and then proceed to the formation of the composite material. Where the treatment step overlaps with the composite formation process the excess treatment solution may be expelled from the composite forming procedure and collected.

The formation of the composite material will otherwise be carried out according to the various techniques known in the art. Generally these will involve compression of the substrate and its subjection to an elevated temperature.

The pressure employed in the compression step and the period for which that pressure is maintained will be at least that required to form a coherent composite material and will in general correspond to those conditions known to be required to form any particular composite material from a particular substrate. However, the time for which the pressure is maintained and the temperature at which the compression is effected should be sufficient to ensure that the treated substrate particles bond together to form a strong composite material. The times and temperatures which are used may vary through a wide range but in general temperatures of up to 200° C. and times of up to 16 hours may be employed. The use of temperatures of greater than 180° C. may lead to the degradation of the wood by pyrolysis and are thereby best avoided. The use of higher temperatures may facilitate the use of shorter times but whatever temperatures are employed the time must be sufficient to enable the substrate to bond together to form a strong uniform composite material.

In the production of chipboard by the compression of a mass of wood chips, we have found that the temperature of the presses may usefully be in the range 125° to 175° C., more usually 140° to 160° C., whilst the time required to produce a useful board product may be five minutes or even less, say 2 minutes, although this varies in particular with the nature of the reagent and longer press times, e.g. of 30 minutes or more may be preferable.

The properties of the composite materials, particularly their water absorption characteristics, may be improved if higher temperatures are used in their formation.

Alternatively, it may be advantageous to condition the boards at elevated temperature, e.g. a temperature in the range 50° to 150° C. Generally where higher temperatures are used in the formation of the composite material, only a small additional improvement will be obtained in such a conditioning step. Processes which comprise such a conditioning step are potentially valuable as a technique for improving the properties of the composite and thus formed a preferred aspect of this invention.

The composite materials produced by the processes of this invention exhibit superior resistance to water than conventional composites. Composite materials produced by the compression of wood chips (chipboard) and wood flakes (flakeboard) possessing a swellability upon immersion in water of less than 10% are believed to be novel and form a further aspect of this invention. In particular such composites which combine this water resistance with an Internal Bond Strength (IBS) of at least 0.3 MPa (chipboard), and 0.8 MPa (fibreboard) form a preferred aspect of the invention.

The invention finds particular application in the manufacture of particle boards especially chipboard, fibreboard and flakeboard.

The invention is illustrated by the following examples:

EXAMPLE 1

A series of chipboards were prepared by immersing samples comprising 40 gms of pine wood chips in a 0.5 molar solution of hexamethylene diisocyanate in pyridine at 100° C. for a predetermined period (the reaction time). The solution was drained from the chips which were transferred to a press and pressed for a predetermined period to produce boards of 10 mm thickness. The Internal Bond Strength (IBS) Modulus of Elasticity (MOE) and Modulus of Rupture (MOR) were determined using the procedures described in British Standard 5699 (modified to suit the size of board produced by the laboratory sized press [170 mm by 170 mm]).

The results are presented as Table I.

TABLE I

| Reaction (Hr) | Press (Hr) | Density (g cm$^{-3}$) | IBS (MPa) | Swell (%) | MOE (MPa) | MOR (MPa) |
| --- | --- | --- | --- | --- | --- | --- |
| 0.5 | 16 | 0.48 | 0.129 | 10.0 | 163 | 4.66 |
| 1.0 | 16 | 0.49 | — | 9.9 | 243 | 12.15 |
| 2 | 16 | 0.48 | — | 10.9 | 937 | 18.27 |
| 2 | 16 | 0.52 | 0.564 | 10.7 | 516 | 13.17 |
| 24 | 16 | 0.50 | 0.597 | 10.0 | 290 | 4.66 |
| 62 | 16 | 0.52 | 0.309 | 10.0 | 240 | 3.35 |
| 168 | 64 | 0.52 | — | 10.0 | 227 | 6.55 |
| Conventional Board UF Resin | | 0.52 | 0.371 | 16.63 | 624 | 16.46 |

EXAMPLE 2

Oven dry wood chips were immersed in a 0.5M solution of toluene diisocyanate in pyridine at room temperature for 15 minutes. The excess solution was drained and the chips pressed at 100° C. for the times indicated to produce boards of 10 mm thickness. The properties of the board were as follows:

| Press (Hr) | Density (g cm$^{-3}$) | IBS (MPa) | Swell (%) | MOE (MPa) | MOR (MPa) |
|---|---|---|---|---|---|
| 16 | 0.50 | 1.280 | 8.1 | 644 | 18.82 |

A second batch of chips was treated with the solution for 48 hours at 100° C. and a board formed and tested in an identical manner. The results were:

| Press (Hr) | Density (g cm$^{-3}$) | IBS (MPa) | Swell (%) | MOE (MPa) | MOR (MPa) |
|---|---|---|---|---|---|
| 16 | 0.44 | | 9.8 | | |

EXAMPLE 3

Oven dry wood chips were immersed in a 0.5M solution of hexamethylene diisocyanate in acetone which comprised 0.25M of dibutyl tin diacetate catalyst at a temperature of 50° C. for a period of 2 hours. The excess solution was drained and the chips pressed into a series of boards at a temperature of 100° C. using the press times shown in Table II to produce boards of 10 mm thickness.

TABLE II

| Press (Hr) | Density (g cm$^{-3}$) | IBS (MPa) | Swell (%) | MOE (MPa) | MOR (MPa) |
|---|---|---|---|---|---|
| 2 | 0.55 | 0.595 | 10.7 | 612 | 13.69 |
| 2 | 0.55 | — | 10.5 | — | — |
| 16 | 0.47 | 0.807 | 9.4 | 419 | 11.97 |
| 16 | 0.54 | 0.348 | 10.1 | 196 | 6.2 |
| 96 | 0.55 | — | — | — | — |

EXAMPLE 4

Oven dry wood chips were immersed in a 0.5M solution of hexamethylene diisocyanate in acetone which comprised 0.12M of diazobicyclo [2,2,2,] octane for the reaction times shown in Table III. The excess solution was drained and the chips pressed for the times shown in Table III to produce boards of 10 mm thickness.

TABLE III

| Reaction (Hr) | Press (Hr) | Density (g cm$^{-3}$) | IBS (MPa) | Swell (%) | MOE (MPa) | MOR (MPa) |
|---|---|---|---|---|---|---|
| 2 | 16 | 0.44 | 0.704 | 11.3 | 807 | 12.35 |
| 5 | 16 | 0.46 | 0.148 | 9.0 | 537 | 12.40 |

EXAMPLE 5

Oven dry wood chips were immersed in a 0.5M solution of methylene diphenylisocyanate in acetone which comprised 0.25M of dibutyl tin diacetate catalyst. The solution was drained and the chips pressed at 100° C. for 16 hours to give a board of 10 mm thickness having the following properties:

| Press (Hr) | Density (g cm$^{-3}$) | IBS (MPa) | Swell (%) | MOE (MPa) | MOR (MPa) |
|---|---|---|---|---|---|
| 16 | 0.65 | 1.510 | 12.0 | 734 | 13.40 |

EXAMPLE 6

Oven dry wood chips were immersed in a 0.3M solution of hexamethylene diisocyante in acetone which comprised either 0.1M dibutyl tin diacetate catalyst (Table IV) or 0.06M diazobicyclo [2,2,2,] octane catalyst (Table V) for 2 hours at 50° C. The excess solution was drained and the chips pressed for 5 minutes at room temperature to give a board of 12 mm thickness. The temperature of the press platens was increased to 150° C. over a period of 15 minutes and maintained for the time shown in the following Tables:

TABLE IV

| Hot Press (mins) | Density (g cm$^{-3}$) | IBS (N mm$^{-2}$) | Swell 1 (%) | Recovery (%) | Swell 2 (%) |
|---|---|---|---|---|---|
| 20 | 0.41 | 0.104 | 9.2 | 66 | 7.9 |
| 20 | 0.43 | 0.219 | 9.2 | 82 | 9.0 |
| 20 | 0.45 | 0.392 | 10.2 | 59 | 7.3 |

TABLE V

| Hot Press (mins) | Density (g cm$^{-3}$) | IBS (N mm$^{-2}$) | Swell 1 (%) | Recovery (%) | Swell 2 (%) |
|---|---|---|---|---|---|
| 40 | 0.38 | 0.272 | 6.2 | 100 | 51 |
| 40 | 0.42 | 1.085 | 7.2 | 100 | 59 |
| 40 | 0.41 | 0.443 | 8.3 | 70 | 80 |

EXAMPLE 7

Oven dry wood chips were immersed in a 0.3M solution of hexamethylene diisocyanate in the presence of 25 gm of dibutyltin diacetate or 5 gm of diazobicyclooctane for 2 hours at 50° C. The excess solution was drained off. Wood veneers were soaked in the solution at room temperature for 5 minutes then placed top and bottom of the chip mattress prior to pressing. The whole was pressed for 16 hours at 100° C.

The resulting board had an MOE of 905 MPa and an MOR of 25.67 MPa. The veneer did not separate from the board in these tests.

EXAMPLE 8

The procedure of Example 7 was repeated except that the veneers were treated with methylene diphenyl isocyanate as well as being presoaked. The resulting board had an IBS of 0.813 MPa, and MOE of 540 MPa and an MOR of 25.56 MPa.

EXAMPLE 9

Boards were made using 80 g of oven-dry softwood chips treated with 42 g of diphenylmethane diisocyanate (MDI) and 12.5 ml of dibutyltin diacetate (DBT) as catalyst in 1 liter of dry acetone for two hours at a temperature of 50° C. The board matresses were made in a 13 cm die and pressed to a thickness of 12 mm at a temperature of 180° C. for 5 minutes.

Each board was weighed immediately after pressing to determine the weight percent gain (wpg) achieved.

Boards were conditioned at 20° C. and 65% relative humidity then measured for density and tested for MOR, MOE and IBS. MOR and MOE were re-tested after a 24 hour cold water soak. Swelling and weight gain were measured after 24 hour cold water soak and after a 2 hour soak in boiling water followed by a 1 hour soak in cold water. IBS, residual swelling and weight loss were measured after drying and re-conditioning.

Results

| Press temp °C. | Initial | | Retained | | | cold soak | | | boiled | | residual | | | |
|---|---|---|---|---|---|---|---|---|---|---|---|---|---|---|
| | wpg | density | MOR | MOE | IBS | MOR % | MOE % | IBS % | swell % | wt % | swell % | wt % | swell % | wt % |
| 150 | 28 | .714 | 35.2 | 941 | 1.87 | 60 | 26 | 90 | 7.7 | 11.1 | 18.3 | 84 | 7.7 | −1.10 |
| 160 | 25 | .697 | 32.8 | 769 | 1.90 | 78 | 33 | 80 | 6.2 | 8.9 | 17.6 | 86 | 6.5 | −0.90 |
| 170 | 28 | .733 | 30.1 | 810 | 1.65 | 56 | 37 | 101 | 8.4 | 9.3 | 20.0 | 79 | 10.0 | −0.87 |
| 180 | 27 | .722 | 35.3 | 922 | 1.91 | 76 | 63 | 117 | 6.8 | 8.8 | 18.4 | 78 | 8.1 | −0.67 |
| 190 | 25 | .693 | 34.5 | 869 | 2.06 | 63 | 55 | 88 | 7.3 | 10.8 | 18.9 | 84 | 9.1 | −0.36 |
| 200 | 21 | .668 | 32.5 | 815 | (.45) | 56 | 45 | (265) | 8.3 | 11.7 | 19.2 | 95 | 9.1 | −0.23 |

EXAMPLE 10

Boards were made using softwood chips and either diphenylmethane diisocyanate (MDI) or diisocyanatohexane (HDI) with a dibutyltin diacetate (DBT) catalyst. Each board was made with 80 g of oven-dry wood chips which were treated with the reagent system in 1 liter of dry acetone for two hours at a temperature of 50° C. The board mattresses were made in a 13 cm × 13 cm former and pressed between pre-heated plates at 150° C. without any sideways restraint.

Boards were conditioned at 20° C. and 65% relative humidity then measured for density and tested for MOR, MOE and IBS. MOR and MOE were re-tested after a 24 hour cold water soak. Swelling and weight gain were measured after 2 hour cold water soak and after a 2 hour soak in boiling water followed by a 1 hour soak in cold water. IBS, residual swelling and weight loss were measured after drying and re-conditioning.

| Press time min | density | Initial | | | Retained | | | cold soak | | boiled | | residual | | |
|---|---|---|---|---|---|---|---|---|---|---|---|---|---|---|
| | | MOR | MOE | IBS | MOR % | MOE % | IBS % | swell % | wt % | swell % | wt % | swell % | wt % | |
| *1. Effect of press time on MDI boards.* | | | | | | | | | | | | | | |
| *Boards were made with 83.3 g MDI and 25 ml DBT.* | | | | | | | | | | | | | | |
| 20 | .594 | 21.7 | 892 | 2.16 | 60 | 39 | 90 | 4.7 | 10.7 | 8.6 | 90 | | | |
| 10 | .556 | 23.0 | 1290 | 1.62 | 52 | 29 | 86 | 5.6 | 13.6 | 9.1 | 90 | | | |
| 5 | .594 | 15.2 | 552 | 1.05 | 52 | 38 | 129 | 4.2 | 8.9 | 8.0 | ·74 | | | |
| 2.5 | .610 | 20.0 | — | 1.79 | 60 | — | 73 | 5.5 | 9.3 | 9.8 | 69 | | | |
| *2. Effect of press time on HDI boards.* | | | | | | | | | | | | | | |
| *Boards were made with 54 ml HDI and 25 ml DBT.* | | | | | | | | | | | | | | |
| 40 | .530 | 10.5 | 468 | .88 | 32 | 27 | | 7.4 | 12.9 | 13.5 | 134 | 5.6 | −1.1 | |
| 30 | .518 | 7.0 | 317 | .24 | 103 | 50 | 97 | 7.6 | 13.9 | 15.4 | 140 | 5.4 | −4.9 | |
| 20 | .534 | 10.0 | 461 | >.1 | 42 | 25 | — | 7.7 | 12.3 | 18.9 | 137 | 6.9 | −5.1 | |

| Strength soln. % | density | Initial | | | Retained | | | cold soak | | boiled | | residual | | |
|---|---|---|---|---|---|---|---|---|---|---|---|---|---|---|
| | | MOR | MOE | IBS | MOR % | MOE % | IBS % | swell % | wt % | swell % | wt % | swell % | wt % | |
| *3. Effect of reagent concentration on MDI boards.* | | | | | | | | | | | | | | |
| *Boards were made with the concentration of MDI and DBT reduced.* | | | | | | | | | | | | | | |
| *The boards were pressed for 5–10 minutes.* | | | | | | | | | | | | | | |
| 100 | .556 | 23.0 | 1290 | 1.618 | 52 | 29 | 86 | 5.6 | 13.6 | 9.1 | 90 | | | |
| 50 | .643 | 33.3 | 1112 | 1.87 | 47 | 52 | 99 | 3.0 | 6.8 | 7.4 | 68 | | | |
| 25 | .653 | 17.4 | 476 | .90 | 64 | 41 | — | 8.7 | 7.2 | 15.4 | 157 | 8.8 | −7.5 | |
| *4. Effect of reagent concentration on HDI boards.* | | | | | | | | | | | | | | |
| *Boards were made with the concentration of HDI and DBT reduced.* | | | | | | | | | | | | | | |
| *The boards were pressed for 30 minutes.* | | | | | | | | | | | | | | |
| 100 | .518 | 7.0 | 317 | .235 | 103 | 50 | 97 | 7.6 | 13.9 | 15.4 | 140 | 5.4 | −4.9 | |
| 50 | .481 | 11.2 | 609 | .459 | 35 | 16 | 25 | 14.2 | 26.4 | 26.2 | 175 | 15.4 | −1.2 | |

We claim:

1. A process for the production of a composite material, which process comprises the steps of:
   immersing a cellulosic substrate in a solution of a di-functional isocyanate in an aprotic swelling solvent to cause said cellulosic substrate to swell, said cellulosic substrate reacting with said isocyanate; and
   then compressing the substrate to form a composite material.

2. A process according to claim 1 wherein the solution comprises from 0.1 to 5.0 moles/liter of di-functional isocyanate.

3. A process according to claim 1 wherein the di-functional isocyanate is a polyisocyanate.

4. A process according to claim 3 wherein the di-functional isocyanate is a di-isocyanate.

5. A process according to claim 4 wherein the di-isocyanate is selected from the group, consisting of hexamethylene diisocyanate, 2,4 toluene diisocyanate, 2,6 toluene diisocyanate and diphenyl methane diisocyanate.

6. A process according to claim 1 wherein the immersing is carried out for a period of from 0.02 to 200 hours.

7. A process according to claim 1 wherein the solvent is selected from the group consisting of pyridine, acetone and 2-methyl-2-pyrrolidinones.

8. A process according to claim 1 characterised in that the immersing is carried out at a temperature of from 25° to 150° C.

9. A process according to claim 1 characterised in that the compressing carried out at a temperature of less than 200° C.

10. A process according to claim 9 characterised in that the compressing is carried out at a temperature of from 125° to 175° C.

11. A process according to claim 1 characterised in that the compressing is applied for a period of from 2 to 30 minutes.

* * * * *